US008838963B2

(12) United States Patent
Kearney, III et al.

(10) Patent No.: US 8,838,963 B2
(45) Date of Patent: Sep. 16, 2014

(54) SECURITY ENHANCEMENT ARRANGEMENT

(75) Inventors: Philip F. Kearney, III, San Jose, CA (US); Robert Dale Newberry, Jr., San Jose, CA (US); James Woodyatt, San Francisco, CA (US); John A. Saxton, Campbell, CA (US)

(73) Assignee: Apple Inc., Cupertino, CA (US)

( * ) Notice: Subject to any disclaimer, the term of this patent is extended or adjusted under 35 U.S.C. 154(b) by 2499 days.

(21) Appl. No.: 11/051,923

(22) Filed: Feb. 4, 2005

(65) Prior Publication Data

US 2006/0179300 A1    Aug. 10, 2006

(51) Int. Cl.
*G06F 21/00* (2013.01)

(52) U.S. Cl.
USPC .......................................................... 713/162

(58) Field of Classification Search
USPC .......................................................... 713/162
See application file for complete search history.

(56) References Cited

U.S. PATENT DOCUMENTS

| | | | | |
|---|---|---|---|---|
| 7,120,791 | B2* | 10/2006 | Volpano et al. | 713/153 |
| 7,448,081 | B2* | 11/2008 | Balissat et al. | 726/15 |
| 7,480,794 | B2* | 1/2009 | Kersey et al. | 713/153 |
| 2001/0055283 | A1* | 12/2001 | Beach | 370/328 |
| 2002/0022483 | A1* | 2/2002 | Thompson et al. | 455/439 |
| 2003/0031154 | A1 | 2/2003 | Kobayashi et al. | |
| 2004/0125744 | A1* | 7/2004 | Perrot et al. | 370/212 |
| 2004/0218580 | A1* | 11/2004 | Bahl et al. | 370/350 |
| 2004/0228319 | A1* | 11/2004 | Melville et al. | 370/349 |
| 2005/0025182 | A1* | 2/2005 | Nazari | 370/469 |
| 2005/0124294 | A1* | 6/2005 | Wentink | 455/41.2 |
| 2005/0180367 | A1* | 8/2005 | Dooley et al. | 370/338 |
| 2005/0192013 | A1* | 9/2005 | Perrot et al. | 455/445 |
| 2006/0056366 | A1* | 3/2006 | Dupler et al. | 370/338 |
| 2006/0165103 | A1* | 7/2006 | Trudeau et al. | 370/401 |
| 2006/0179300 | A1* | 8/2006 | Kearney et al. | 713/162 |

FOREIGN PATENT DOCUMENTS

WO    2004070970 A1    8/2004

OTHER PUBLICATIONS

Simple mobility support for IPsec tunnel mode Byoung-Jo, K. ; Srinivasan, S. ;Simple mobility support for IPsec tunnel mode, Byoung-Jo, K. ; Srinivasan, S. Vehicular Technology Conference, 2003. VTC 2003-Fall. 2003 IEEE 58th vol. 3, Publication Year: 2003.*
Handover management for mobile nodes in IPv6 networks, Montavont, N. ; LSIIT, Univ. Louis Pasteur, Strasbourg, France ; Noel, T., Communications Magazine, IEEE (vol. 40 , Issue: 8) Date of Publication: Aug. 2002.*
PCT International Search Report received in corresponding International application No. PCT/US2006/000667, dated May 11, 2006.

* cited by examiner

*Primary Examiner* — Harris Wang
(74) *Attorney, Agent, or Firm* — Wong, Cabello, Lutsch, Rutherford & Brucculeri, LLP

(57) ABSTRACT

Disclosed herein is a system for enhancing the security of wireless networks. In one aspect, a wireless access point that functions as a bridge between two networks is provided. The wireless access point is configured to establish separate associations for itself and each device connected to it. This provides for enhanced security in that each device connected to the wireless access point may be separately authenticated and in that separate encryption tunnels are established for each device connected to the wireless access point.

6 Claims, 3 Drawing Sheets

SECURITY ENHANCEMENT ARRANGEMENT

BACKGROUND

Within the last several years, wireless networking has become increasingly popular. Wireless networking provides numerous benefits, both in public settings and within a closed home or office network. One drawback of wireless networking can be a lack of security or reduced security as compared to a wired network. These security deficiencies have been exacerbated by the design and operation modes of typical wireless network equipment.

One example of such a deficiency lies in the use of encrypted channels between a wireless client and the remaining network. Historically, wireless networking devices such as wireless bridges or access points have aggregated data and identifiers (e.g., MAC addresses) from multiple connected devices and presented itself to the network using its own identifier (e.g., it's own MAC address). This network address translation (NAT) arrangement results in two undesirable security problems. First, because only a single MAC address is presented to the wired network, the authentication systems in place on the wired network are not extended to the wireless clients. Second, only a single encryption stream is established across the wireless link, and thus security for all devices connected over this wireless link is breached when the encryption for the single datastream is breached.

Therefore, what is needed in the art is a way to establish multiple wireless associations between a pair of wireless devices and provide for a plurality of encrypted datastreams each correlated to a single device residing on the other side of the wireless link.

SUMMARY

The present invention relates to a system for enhancing the security of wireless networks. In one aspect, a wireless access point that functions as a bridge between two networks is provided. The wireless access point is configured to establish separate associations for itself and each device connected to it. This provides for enhanced security in that each device connected to the wireless access point may be separately authenticated and in that separate encryption tunnels are established for each device connected to the wireless access point.

DETAILED DESCRIPTION

A security arrangement for wireless networks is described herein. The following embodiments of the invention, described in terms of devices and applications compatible with computer systems manufactured by Apple Computer, Inc. of Cupertino, Calif., are illustrative only and should not be considered limiting in any respect.

Figure 1:
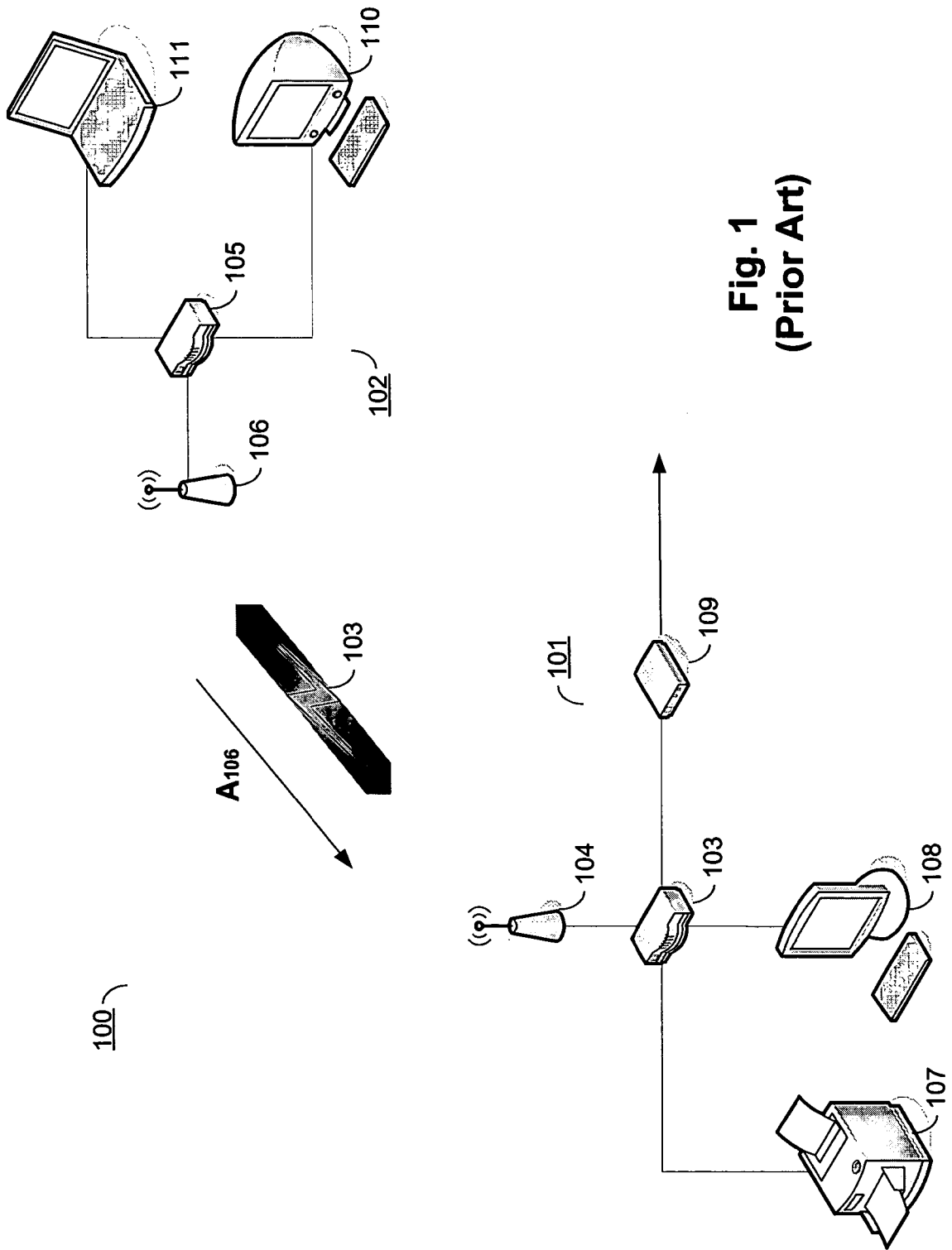
FIG. 1 illustrates two wired networks, bridged by a wireless network connection according to one technique of the prior art.

An exemplary wired/wireless network 100 is illustrated in FIG. 1. Network 100 comprises a first wired network 101 and a second wired network 102 interconnected by wireless network link 103. The wireless network interface preferably takes the form of a "WiFi" interface according to the IEEE (Institute of Electrical and Electronics Engineers) 802.11, 802.11a, 802.11b, or 802.11g standards, which are hereby incorporated by reference. The wireless network interface allows the two networks to communicate wirelessly with each other and thus serve as a bridge between the two networks. This enables devices on network 102 to access resources on network 101 (e.g., an Internet connection or peripheral device) and vice versa.

Network 101 comprises various devices, such as personal computer 108 and printer 107. The network also features a connection to the Internet through broadband modem 109, which may be, for example, a cable modem or DSL (digital subscriber line) modem. Also part of network 101 is wireless base station 104, which provides a wireless link to network 102 (discussed below) and may also provide network access to other wireless network devices, such as laptops, PDAs, etc.

The various interconnections of network 101 pass through switch/router 103. In some embodiments, wireless base station 104 may be integral with switch/router 103. Depending on the exact functionality required, switch/router 103 may be some combination of switch, hub, firewall, router, wireless access point, wireless repeater, DHCP (dynamic host configuration protocol) server, etc. This type of combination device is generally known in the art, and many commercial embodiments of such devices are available, examples of which include the AirPort Extreme® and AirPort Express™ base stations available from Apple Computer.

Network 102 has a similar configuration to network 101. Notebook computer 111 and desktop computer 110 are connected to switch/router 105. Network 102 also includes a wireless base station 106, which, may be integral with switch/router 105. Additionally, other wireless devices (not shown) may obtain access network 102 using wireless access point 106. Wireless access point 106 is in wireless network communication with wireless access point 104, effectively bridging network 101 and network 102 to form network 100. This allows devices connected to network 102 to access resources on network 101 such as printer 107, Internet connection 109, and further enables file sharing among the various devices.

For a device to communicate using a wireless network, it is necessary for the device to "associate" with the wireless network, which is the process by which a physical layer connection to the network is established. Each association depends on the device and the network having a common set of communication parameters, such as an extended service set identifier (ESSID), radio channel, and encryption settings. If these parameters do not match between the device and the base station, the device will not be able to communicate with the network.

Historically, wireless network access points have followed one of two approaches to wireless bridging, i.e., the interconnection of connection of two networks via a wireless connection. In one approach, wireless access point 106 establishes a single association $A_{106}$ with wireless access point 104. When one of the devices on network 102 attempts to communicate with a device on network 101, access point 106 performs network address translation on the request so that from the perspective of wireless access point 104, the request appears to come from access point 106. Packets from any and all devices on network 102 will thus appear to wireless access point 104 to have come from wireless access point 106. Wireless access point 106 will therefore need to have some form of switching/routing logic to process the replies, which will all be addressed to wireless access point 106. Alternatively, the network address translation functions may be performed by switch/router 105 if the wireless access point 106 and switch/router 105 are integrated into a single device.

There are two basic problems with this approach to wireless bridging. One problem arises from the fact that all of the devices on network 102 are effectively hidden from network 101. The network address translation performed by wireless access point 106 effectively isolates all of network 102 from the view of network 101. This poses a security risk to network 101 because there is no way that devices accessing network 101 from network 102 can be authenticated. The second problem is that there is only a single encryption stream between network 101 and 102. Therefore if this encryption stream is compromised, all of the traffic between the two networks becomes unsecured.

Figure 2:
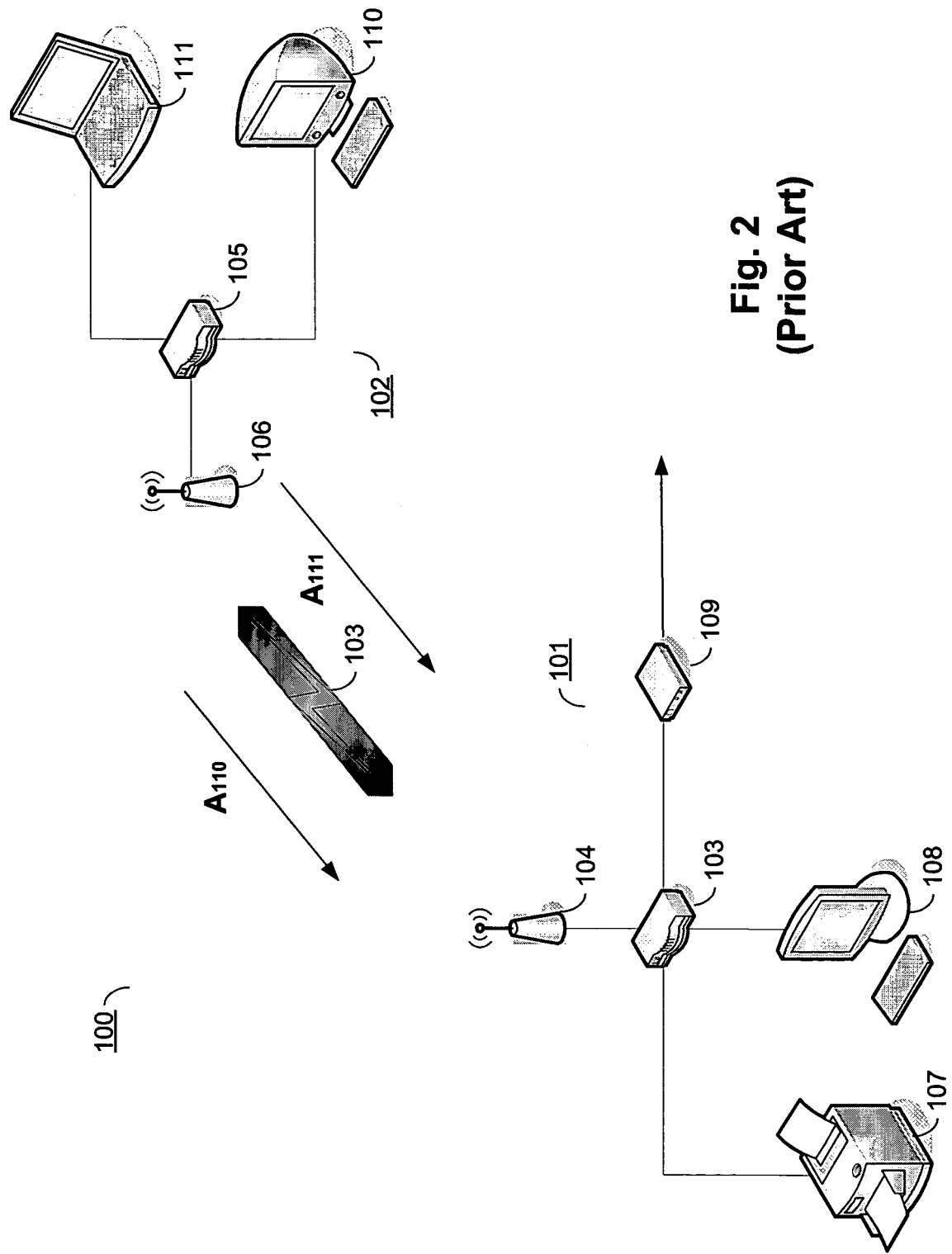
FIG. 2 illustrates two wired networks, bridged by a wireless network connection according to a second technique of the prior art.

An alternative prior art approach to wireless bridging, illustrated in FIG. 2, is for access point 106 to establish a separate association for each device on network 102. Thus when notebook computer 111 requests a connection to a resource on network 101, wireless access point 106 establishes association $A_{111}$ with wireless access point 104. Then, when desktop computer 110 requests a connection to a resource on network 101, wireless access point 106 tears down the $A_{111}$ association and establishes an association $A_{110}$. This process repeats itself as necessary as various devices attempt to communicate across the wireless bridge.

This alternative approach to wireless bridging also suffers from various deficiencies. First, the overhead associated with setting up and tearing down associations imposes a significant performance penalty on the wireless connection 103, particularly as the number of devices increases. Second, because wireless access point 106 effectively acts as a proxy for whatever device it is communicating on behalf of, devices on network 102 are still in effect hidden from network 101, making it impossible to properly authenticate these devices.

The deficiencies arising from both prior art approaches to wireless bridging arise from the fact that prior art wireless access points have been designed so as to maintain only a single association at any given time. This forces one to choose between allowing the access point to have its own association, and act as a network address translator, or allowing the access point to act as a proxy for whichever device is using the wireless interlink. Although wireless networking devices are available that are able to maintain multiple associations simultaneously, to the best of the inventor's knowledge, all such devices have included multiple radios, with each radio device maintaining a single association and a particular time. This increases both the cost and complexity of wireless network devices, and is an impractical solution as the number of devices increases because maintaining associations for N devices would require a wireless access point with N radios.

Figure 3:
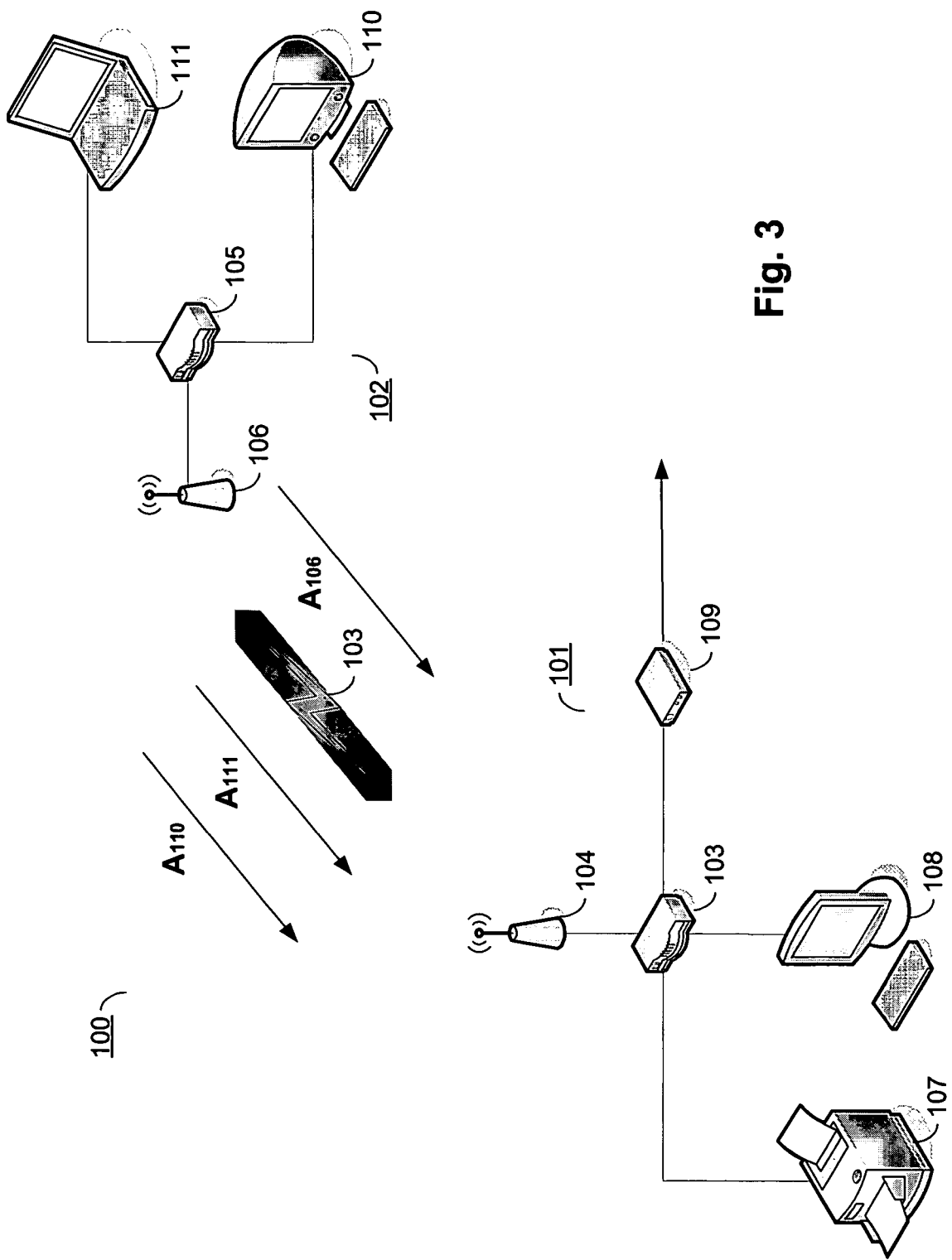
FIG. 3 illustrates two wired networks, bridged by a wireless network connection according to certain teachings of the present invention.

Thus the present invention is directed to a wireless access point that is capable of maintaining an association for each device on its network with only a single radio. Operation of this device may be better understood with reference to FIG. 3. To bridge wireless networks 102 and 101, wireless access point 106 establishes an association $A_{106}$ with wireless access point 104. Additionally, wireless access point 106 establishes an association $A_{110}$ corresponding to desktop computer 110 and an association $A_{111}$ corresponding to notebook computer 111. Each association correlates to the media access control (MAC) address of the respective device, which provides for addressing at the lowest communications layers. Wireless access point 106 is configured to receive traffic for each of the devices on network 102 and route this traffic to the appropriate device. In this way, wireless access point 106 essentially serves as a proxy for each device on network 102 in its communications with network 101.

Because it has established associations for each device on network 102, network 101 is able to identify each individual device on network 102 separately. The ability of network 101 to see each device provides enhanced security for network 101. Because each device is visible and identifiable by its unique MAC address, network 101 is able to properly authenticate each device. Additionally, separate encryption streams, using separate keys, initialization vectors, etc., may be established with each device. This provides additional advantage in that the compromise of one encryption stream will not compromise all network traffic traversing the wireless bridge.

Performance and security of the network may be further enhanced by implementing various wireless network security protocols on wireless access point 106. Using the standard WEP (Wired Equivalent Privacy) encryption standard, encryption management for wireless access point is fairly simple because each device on the network uses the same WEP key. The situation is somewhat complicated when enhanced security algorithms are used. In general, multiple key pairs are required. However, currently available wireless network chipsets typically have hardware allocation for up to 256 encryption key pairs. This feature has been provided so that a device may be configured to connect to multiple wireless networks, e.g., at different locations. However, by configuring wireless access point 106 to allocate each of the key pairs to one of the devices on network 102, wireless access point 106 is able maintain a separate encryption stream, using separate keys, for each device.

One enhanced security algorithm that may be used is WPA (WiFi Protected Access). WPA encryption is described in the IEEE 802.11i standard, which is hereby incorporated by reference. Those skilled in the art are generally familiar with this security framework, and thus the details are not repeated here. In general, WPA comprises two components, the security enhancements specified in the IEEE 802.1X standard and the Temporal Key Integrity Protocol (TKIP). The enhancements provided by IEEE 802.1X include port-based access controls that support robust upper layer authentication as well as providing for the use of session keys, thus enabling the encryption keys to change frequently, thus enhancing security. TKIP provides four security enhancements. First, TKIP extends the initialization vector space, thus effectively lengthening the encryption key used per packet and extending the amount of time before initialization vectors are reused, thereby enhancing resistance to dictionary-building attacks. Second, TKIP allows for per-packet key construction, meaning that each packet is encrypted using a different key. Third, TKIP provides greater cryptographic integrity. Finally, TKP provides a mechanism for key derivation and distribution.

By providing a wireless access point capable of establishing multiple associations with a second wireless device, network security may be greatly enhanced. Because each device has its own association, it may become possible to extend authentication across a wireless bridge. Additionally, the provision of separate encryption tunnels to each device residing across the wireless bridge provides enhanced security for each device. Furthermore, because of the design of prior art chipsets, the changes required to support these changes may be made relatively easily with simple software and/or firmware changes, and thus expensive hardware design is not required.

While the invention has been disclosed with respect to a limited number of embodiments, numerous modifications and variations will be appreciated by those skilled in the art.

For example, for this disclosure, the term "computer" does not necessarily mean any particular kind of device, combination of hardware and/or software, nor should it be considered restricted to either a multi purpose or single purpose device. It is intended that all such variations and modifications fall with in the scope of the following claims.

What is claimed is:

1. A system comprising:
a first network comprising one or more devices and a first physical wireless access point device; and
a second network comprising one or more devices and a second physical wireless access point device, the second physical wireless access point device comprising at least one individual radio transceiver enabled to maintain multiple wireless network associations;
wherein the second physical wireless access point device is configured to:
bridge the first and second networks using a radio link established using the at least one individual radio transceiver by:
establishing a plurality of wireless network associations with the first physical wireless access point device using the radio link, each wireless network association uniquely corresponding to one of the second physical wireless access point device and the one or more devices on the second network; and
establishing an encryption tunnel for each of the plurality of wireless network associations, wherein a first encryption tunnel between the second physical wireless access point device and the first physical wireless access point device uses a first network security protocol and a second encryption tunnel between the second physical wireless access point device and the first physical wireless access point device uses a second network security protocol that is different from the first network security protocol,
wherein the plurality of network associations are established such that the first network is enabled to individually authenticate each of the second physical wireless access point device and the one or more devices on the second network, and
wherein the first and second network security protocols are selected from the group consisting of a WPA protocol, an 80211i and a WEP protocol.

2. A method of connecting a plurality of computer devices on a first network to a second network using a first physical wireless access point device configured to act as a wireless bridge, the method comprising:
establishing a wireless network association between the first physical wireless access point device and a second physical wireless access point device connected to the second network using a radio link established using an individual radio transceiver of the first physical wireless access point device;
establishing one or more additional wireless network associations between the first physical wireless access point device and the second physical wireless access point device using the radio link, each of the one or more additional wireless network associations uniquely corresponding to one or more devices on the first network; and
establishing an encryption tunnel for each of the wireless network associations,
establishing an encryption tunnel for each of the wireless network association and the one or more additional wireless network associations, wherein a first encryption tunnel between the second physical wireless access point device and the first physical wireless access point device uses a first network security protocol and a second encryption tunnel between the second physical wireless access point device and the first physical wireless access point device uses a second network security protocol that is different from the first network security protocol,
wherein the wireless network association and the one or more additional wireless network associations are established such that the first network is enabled to individually authenticate each of the first wireless access point and the one or more devices on the first network, and
wherein the first and second network security protocols are selected from the group consisting of a WPA protocol, an 80211i and a WEP protocol.

3. A wireless access point device, the device comprising:
at least one individual radio transceiver enabled to maintain multiple wireless network associations;
at least one network interface configured to connect to one or more devices on a first network; and
at least one network interface connected to the at least one individual radio transceiver and configured to establish a connection to a second wireless access point device connected to a second network, the connection across a radio link established by the at least one individual radio transceiver;
wherein the wireless access point device is configured to bridge the first and second networks by:
establishing a plurality of wireless network associations with the second wireless access point using the radio link, each wireless network association uniquely corresponding to the wireless access point device and one of the one or more devices on the first network; and
establishing an encryption tunnel for each of the plurality of wireless network associations, wherein a first encryption tunnel between the second wireless access point and the wireless access point device uses a first network security protocol and a second encryption tunnel between the second wireless access point and the wireless access point device uses a second network security protocol that is different from the first network security protocol,
wherein the plurality of wireless network associations are established such that the second network is enabled to individually authenticate each of the wireless access point device and the one or more devices on the first network, and
wherein the first and second network security protocols are selected from the group consisting of a WPA protocol, an 80211i and a WEP protocol.

4. The wireless access point device of claim 3 wherein the at least one network interface configured to connect to one or more devices on a first network comprises a wired network interface.

5. The wireless access point device of claim 3 wherein the at least one network interface configured to connect to one or more devices on a first network comprises a second wireless network interface.

6. The wireless access point device of claim 5 wherein the wireless access point is configured to act as a wireless repeater.

* * * * *

UNITED STATES PATENT AND TRADEMARK OFFICE
CERTIFICATE OF CORRECTION

PATENT NO. : 8,838,963 B2  
APPLICATION NO. : 11/051923  
DATED : September 16, 2014  
INVENTOR(S) : Philip F. Kearney, III et al.

It is certified that error appears in the above-identified patent and that said Letters Patent is hereby corrected as shown below:

In the Claims

Column 6, line 31 (Claim 3, line 15), insert the word --device-- after the phrase "the second wireless access point".
Column 6, line 37 (Claim 3, line 21), insert the word --device-- after the phrase "the second wireless access point".
Column 6, line 40 (Claim 3, line 24), insert the word --device-- after the phrase "the second wireless access point".

Signed and Sealed this
Second Day of December, 2014

Michelle K. Lee
*Deputy Director of the United States Patent and Trademark Office*